United States Patent
Humphrey et al.

(10) Patent No.: US 6,440,541 B1
(45) Date of Patent: Aug. 27, 2002

(54) TOP COAT FOR METALLIC ISLAND COATING SYSTEM

(75) Inventors: William M. Humphrey, Dover; Adam Murano, Derry, both of NH (US)

(73) Assignee: Textron Automotive Company Inc., Troy, MI (US)

( * ) Notice: Subject to any disclaimer, the term of this patent is extended or adjusted under 35 U.S.C. 154(b) by 0 days.

(21) Appl. No.: 09/380,440

(22) PCT Filed: Mar. 1, 1997

(86) PCT No.: PCT/US97/03333

§ 371 (c)(1),
(2), (4) Date: Apr. 3, 2000

(87) PCT Pub. No.: WO98/37986

PCT Pub. Date: Sep. 3, 1998

Related U.S. Application Data

(63) Continuation-in-part of application No. 08/576,072, filed on Dec. 12, 1995, now abandoned.
(60) Provisional application No. 60/002,812, filed on Aug. 25, 1995.

(51) Int. Cl.$^7$ .......................... B32B 15/08; B60R 13/00
(52) U.S. Cl. ........................ 428/209; 427/250; 427/405; 427/409; 427/412.3; 427/412.4; 427/412.5; 428/31; 428/425.5; 428/425.8; 428/450
(58) Field of Search ........................ 428/31, 209, 425.8, 428/450, 425.5; 427/250, 405, 409, 412.3, 412.4, 412.5

(56) References Cited

U.S. PATENT DOCUMENTS

| | | |
|---|---|---|
| 2,992,125 A | 7/1961 | Fustier |
| 2,993,806 A | 7/1961 | Fisher et al. |
| 3,118,781 A | 1/1964 | Downing |
| 3,632,557 A | 1/1972 | Brode et al. |
| 3,666,835 A * | 5/1972 | Schloss .................. 260/858 |
| 3,914,472 A | 10/1975 | Nakanishi et al. |
| 4,101,698 A | 7/1978 | Dunning et al. |
| 4,131,530 A | 12/1978 | Blum et al. |
| 4,211,822 A | 7/1980 | Kurfman et al. |
| 4,215,170 A | 7/1980 | Olivia |
| 4,369,225 A | 1/1983 | Manabe et al. |
| 4,374,237 A | 2/1983 | Berger et al. |
| 4,407,871 A | 10/1983 | Eisfeller |
| 4,431,711 A | 2/1984 | Eisfeller |
| 4,645,816 A | 2/1987 | Pohl et al. |
| 4,713,143 A | 12/1987 | Eisfeller |
| 4,923,720 A | 5/1990 | Lee et al. |
| 4,931,366 A * | 6/1990 | Mullaney, Jr. .............. 428/622 |
| 5,009,367 A | 4/1991 | Nielsen |
| 5,027,742 A | 7/1991 | Lee et al. |
| 5,057,342 A | 10/1991 | Hoy et al. |
| 5,066,522 A | 11/1991 | Cole et al. |
| 5,106,650 A | 4/1992 | Hoy et al. |
| 5,108,799 A | 4/1992 | Hoy et al. |
| 5,141,156 A | 8/1992 | Hoy et al. |
| 5,171,613 A | 12/1992 | Bok et al. |
| 5,178,325 A | 1/1993 | Nielsen |
| 5,182,174 A | 1/1993 | Stephenson |
| 5,198,272 A | 3/1993 | Eisfeller |
| 5,203,843 A | 4/1993 | Hoy et al. |
| 5,211,342 A | 5/1993 | Hoy et al. |
| 5,212,229 A | 5/1993 | Taylor et al. |
| 5,225,248 A | 7/1993 | Stephenson |
| 5,230,962 A | 7/1993 | Stephenson |
| 5,256,490 A * | 10/1993 | Pierce .................. 428/458 |
| 5,286,569 A | 2/1994 | Werner, Jr. et al. |
| 5,290,625 A | 3/1994 | Eisfeller et al. |
| 5,320,869 A | 6/1994 | Eisfeller et al. |
| 5,354,808 A | 10/1994 | Onwumere et al. |
| 5,384,161 A | 1/1995 | Eisfeller et al. |
| 5,464,661 A | 11/1995 | Lein et al. .................. 427/409 |
| 5,468,518 A | 11/1995 | Lein et al. .................. 427/421 |
| 5,482,336 A | 1/1996 | Rouse et al. ............... 293/115 |
| 5,624,759 A * | 4/1997 | Usifer et al. ............ 428/424.2 |
| 5,711,993 A | 1/1998 | Lein et al. .................. 427/250 |
| 5,985,418 A | 11/1999 | Lein et al. .................. 428/195 |

OTHER PUBLICATIONS

*Thin Film Phenomena*, Kasturi L. Chopra, Robert E. Kreige Publishing Company, Huntington, N.Y., 1979 p. 163–189.
*Handbook of Thin Film Technology*, Leon I. Maissel and Reinhard Glang, McGraw–Hill Book Company, New York, N.Y., 1970 p. 8–32–8–43.

* cited by examiner

*Primary Examiner*—D. S. Nakarani
(74) *Attorney, Agent, or Firm*—Grossman, Tucker, Perreault & Pfleger, PLLC

(57) ABSTRACT

Described is a metallized article, and a method for making the same, comprising a substrate having a polyurethane basecoat disposed thereon and with a layer of electrically discrete metallic islands of a corrosion prone metal disposed on the basecoat. A cross-linked polyurethane top coat, which is bound to an organosilane, preferably an epoxy silane, is disposed on and encapsulates the discrete metallic islands. The organsilane is also bound to the metallic islands.

21 Claims, No Drawings

TOP COAT FOR METALLIC ISLAND COATING SYSTEM

CROSS REFERENCE TO RELATED CASES

This application is a continuation-in-part of U.S. Application Ser. No. 08/576,072, filed Dec. 12, 1995, now abandoned. This application also relies in part upon U.S. Provisional Application Ser. No. 60/002,812, filed Aug. 25, 1995.

BACKGROUND OF THE INVENTION

Electrically continuous thin metal layers or films, formed on rigid dielectric substrates by vacuum metallization, have been long used to give substrates a reflective metallic appearance. To slow corrosion of the metal layer, the layer was typically top coated with a clear, colorless dielectric polymeric coating. However, once the top coats are damaged or experience water infiltration, these metal films have experienced widespread corrosion of the metal layer.

More recently, electrically discontinuous metal layers have been developed which appear as continuous metal layers to the naked eye, which are less susceptible to widespread corrosion and which can be applied to flexible substrates. These electrically discontinuous layers consist of discrete metallic islands, which are vacuum deposited on the substrate, wherein the islands are separated by channels. These islands and channels are then topcoated with a dielectric polymeric coating to separately encapsulate each island and to prevent corrosion of the metal islands. However, under weathering conditions the topcoat has experienced a loss of adhesion (e.g., peel) from the metal islands and substrate in the channels allowing water infiltration.

To provide adequate adhesion of the top coat to the discontinuous layer, the metal layer has been etched with a caustic (e.g., sodium hydroxide solution) to remove metal deposited in the channels between the islands to provide a larger substrate surface area for bonding with the top coat. However, caustic etching has resulted in the formation of blackened areas in the metal layer.

Therefore, a need exists for a means of vacuum metallization of rigid and flexible substrates wherein the top coat will adhere to the metallized layer without etching and etch side effects, and wherein the top coat is less susceptible to water infiltration and the loss of adhesion over time and weathering.

SUMMARY OF THE INVENTION

This invention relates to a metallized article comprising a substrate having a layer of electrically discrete metallic islands of a corrosion prone metal disposed on the substrate. Preferably a polyurethane basecoat layer is formed on the substrate prior to forming the metallic islands thereon. A crosslinked polyurethane top coat, bound to an organosilane, preferably an epoxy silane, is disposed on and encapsulates the discrete metallic islands. The organosilane is also is is bound to the metallic islands.

The advantage of this invention is that it improves the bonding of polyurethane top coat to the basecoat or substrate, and to the metal layer deposited on the substrate, without caustic etching of the metal layer. This invention also increases the water resistance (hydrophobicity) of the top coat by increasing polymeric crosslinking within the top coat, thereby enhancing corrosion resistance.

DETAILED DESCRIPTION

The substrates of the present invention include any substrate upon which a reflective metallic coating is desirable. These substrates can be rigid or flexible. Further, these substrates and may or may not be electrically conductive.

Typically, substrates used in the present invention include vehicular/automotive trim applications, sheet stock, sports equipment, clothing and any other items suitable for decoration by inclusion of a reflective metallic surface.

Examples of suitable nonconductive (dielectric) substrates include a wide variety of plastic substrates which are dielectric materials (non-conductive) including thermoplastic materials, thermosetting materials and elastomeric materials, such as thermoset polyurethane, flexible elastomers which may be a natural or synthetic thermoplastic or thermoset polymer having an elongation of at least 30%, polyolefins, as polyethylene, polypropylene, polybutylene or a rubber/polypropylene blend, ABS (polyacrylonitrile-butadiene-styrene), thermoplastics as polyvinyl chloride, Surlyn (DuPont), polyester, polyester elastomer, and the like. Articles made of plastic substrates include, for example, automobile parts such as exterior moldings, bumper guards, dual pulls, mirror housings, grill headers, light bezels, gear shift bezels, door pulls, steering wheel emblems and other exterior and interior automotive trim components. Other plastic articles can be used, for example in the plumbing trade, for household hardware applications, for home decoration, trucks, motor cycles and marine parts.

Examples of suitable conductive substrates include metals, such as aluminum, aluminum alloy, carbon steel, cast iron, brass, copper, nickel, nickel alloy, stainless steel, magnesium alloy and zinc based materials. Articles comprising metal substrates include, for example, faucets, knobs, handles, cutlery, files and blades, golf clubs and irons, hammers, jet blades, rifle barrels, skate blades, camera components and luggage. Preferably, the metal substrate is a vehicle wheel.

It is to be understood with respect to many of the metallic substrates used in the present invention, in particular for wheels, that these substrates may be pretreated prior to the present application process. Such pretreatment may optionally include pickling and/or the application of corrosion resistant coatings. Those corrosion resistant coatings can be phosphate corrosion resistant coatings or epoxy primers such as "E-coat", i.e., a cathodic electrocoat or a coating utilizing powder particles. With respect to aluminum and magnesium alloys, such a corrosion resistant coating may include well known chromium conversion coatings and the like.

It is also understood that an adhesion promoter may be applied to non-metallic substrates, such as chlorinated polyolefin to thermoplastic olefins. Typically, a coating thickness of about 0.1 mils to about 0.4 mils is applied.

The preferred substrates for the present invention are flexible substrates.

The metals that are used to form the layer of metallic islands are metals, or surface oxidized metals that will give a bright surface. Suitable metals are corrosion prone metals including tantalum, copper, silver, nickel, chromium, tin and aluminum and alloys thereof, and the like. Preferably, the metallic islands contain indium, indium alloys and/or indium oxides.

The layer of metallic islands is formed by depositing metal on the substrate, or coated substrate, by thermal evaporization, sputtering, ion plating, induction heating, electron beam evaporation and like methods. More uniform coverage is obtained, particularly around corners, edges or recesses if the metallization occurs in a chamber containing an inert gas such as argon.

The method for forming a layer of metallic islands, on a substrate, a treated substrate or a coated substrate, is described in U.S. Pat. Nos. 4,407,871 and 4,431,711 which are incorporated herein by reference.

Metallization produces a substrate that has a layer of discrete metallic islands deposited thereon. The discrete metallic islands are round in nature and have a thickness, or diameter, small enough to make the metallic film electrically non-conductive, as there are channels between the islands such that there is typically no conductivity between the islands, and alternately large enough to reflect enough light to make the coated article appear as a metal article to the naked eye. Typically, the thickness of the metallic islands will be between about 25 and about 4000 Angstroms (Å), preferably 500–3000 Å. Most preferably, the thickness is between about 500 Å–1200 Å.

In the present invention the layer of metallic islands on the substrate is encapsulated by a top coat. Preferably, a prime coat and/or basecoat was also applied to the substrate prior to metallization.

Typically, the coating composition for the prime coat, basecoat and/or top coat, after curing is a polyurethane or a polyester polyurethane. A resin suitable for forming basecoats and top coats useful in the present invention is described in Example 1.

To increase the adhesion of the polymeric top coat to the metal layer, particularly the metallic islands, and typically, to at least partially cross-link the polymer in the top coat at least one organosilane is added to the top coat resin. A description of the use of organosilanes in resin top coats, for application to metal island layers, is described in U.S. patent application Ser. No. 08/576,072, files Aug. 25, 1996, which is incorporated in its entirety herein by reference.

At least one organosilane must be an organosilane that will react with the polyurethane and with the metal islands, preferably an epoxy silane, and more preferably gamma-glycidoxypropyltrimethoxy silane.

An epoxy silane, which as an additive in the top coat composition, co-reacts upon heating with the urethane resin during curing. While the Applicants do not wish to be bound to any particular theory, it is believed that the epoxide ring of the epoxy silane generally reacts with the isocyanate groups of the urethane resin. It is also believed that a portion of the silane group $SiR_1R_2R_3$, wherein $R_1$, $R_2$, $R_3$ can be hydroxyl or alkoxy, in one or more steps reacts to bond to the metal of the islands (or metal hydroxides coating the surface of the metal islands).

Alternately, it is to be understood that the epoxy silane may be reacted with the urethane portion of the coating material prior to the application of the coating.

The prime coat or basecoat may also be crosslinked to the top coat and/or bound to the metallic islands from epoxy silane contained in the top coat of from epoxy silane that was previously added to the prime coat or basecoat.

The amount of epoxy silane used in the coating is an amount sufficient to bond the polymeric top coat to the metallic islands without clouding the top coat. Typically, the weight of epoxy silane, as a percentage of the total weight of resin and epoxy silane, is between about 0.25% to about 8.0%. An example of a suitable top coat containing an epoxy silane is described in Example 3.

In an alternate embodiment, the topcoat contains both an epoxy silane, such as gamma-glycidoxypropyltrimethoxy silane and a secondary aminosilane, such as bis-(gamma-trimethoxysilylpropyl)amine, to further harden the coat(s) by increasing the degree of polymeric crossliking within the coat. For rigid substrates, the ratio of epoxy silane to aminosilane in the coating is typically between about 1:20 to about 1:5. Preferably, the ratio is about 1:10.

For flexible substrates, the ratio of epoxy silane to aminosilane in the topcoat is typically between about 20:1 to about 5:1. Preferably, the ratio is about 10:1.

The coating compositions, whether they be base coat and/or top coat is cured at a temperature that is high enough to completely cure the coating material but low enough such that the coating does not burn or significantly discolor. Typically, the coating is cured at a temperature range of approximately 150–375° F., for a period of time of about 10 minutes to about 70 minutes, and with controlled humidity, typically with a dew point between about 96° F. to about 105° F. The coating is preferably cured at a temperature between about 250° F. to about 300° F.

The thickness of the coating is typically between about 1 mil to about 5 mils. Preferably, the coating thickness is between about 1.5 mils to about 2.5 mils.

The method for applying a prime coat, basecoat, combined primer/basecoat or top coat composition, to a substrate or a layer of metallic islands, is described in U.S. Pat. Nos. 4,407,871, 4,431,711 and 5,468,518 which are incorporated herein by reference. Typical methods include spray coating, dip coating, flow coating and knife-over-roll coating.

Generally, a coating is applied in an organic solvent system wherein the organic solvent(s) comprise about 40% to about 90% of the weight of the pre-cured coating composition. The urethane resin is typically about 10% to about 50% by weight of the pre-cured coating composition.

A wide variety of organic solvents can be utilized for the commercially available coating compositions, such as aromatic hydrocarbons, alkylesters, alcohols, ketones and dialkylethers. Preferably, the organic solvent is a solvent blend as is described in Examples 2 and 3.

The application of the coating system described herein is preferably performed by an airless spray gun. The coatings are applied to the substrate at ambient temperature and pressure.

In the application of the coating system to the substrate whether as a basecoat, primer coat or top coat, inorganic carriers, such as carbon dioxide, can be substituted for a portion or all of the organic solvent carriers. The method for applying a coating with a reduced amount of organic solvent is described in U.S. Pat. No. 5,464,661 which is incorporated herein by reference.

The Unicarb® System (Union Carbide) is a useful apparatus for replacing liquid organic solvent with $CO_2$ in spraying coatings in the present invention.

In the method of the present invention, the coatings are typically flashed for approximately 10 to 20 minutes to evaporate the solvents in the coating system and optionally by a curing step after application of each layer. Alternatively, it may be desired to apply another coating after the flashing of the solvent flashing has occurred. This can be characterized as a wet-on-wet system. All that is required after the first coating that is applied, that it is not fully cured. The substrate is in a handleable or tacky condition, prior to application of metal.

Optionally, additional amounts of pigment may be added for a prime or a basecoat typically in the amount of about 0.1% to about 40% by weight of the pre-cured (e.g. sprayable) coating composition. Preferably, the amount of pigment is between about 2% to about 30% by weight.

It has also been found desirable to add a catalyst to the system to assist in the curing of the coating system and optionally a catalyst that is useful to enhance the reaction between the epoxy silane the coating composition itself.

Catalysts to promote the reaction between the silaceous containing material and the coating composition may be such materials as tin containing or amine containing such as di-n-butyltin dilaurate, tri-ethylenediamine and the like.

Typically, the amount of catalyst in the pre-cured coating composition is between about 0.1% to about 10% by weight.

The invention will not be further and specifically described by the following examples.

EXAMPLE 1

Synthesis of Urethane Blend

Capralactone triol (491.3 lbs. of Stock No. PO305 from Union Carbide) and hydroxy terminated polysiloxane copolymer (14.7 lbs. of DC193 from Dow Corning) were added to a reactor which was then sealed and blanketed with nitrogen. While stirring, the contents of the reactor were heated up to a temperature of 220° F. over 15–20 minutes. Temperature was maintained below about 250° F. while stirring. The nitrogen blanket purge was then secured and the reactor contents were subsequently dried under a vacuum.

After drying for an hour, the nitrogen purge of the reactor was restarted. Then, 253 lbs. of urethane grade toluene were added to the reactor over a 3–5 minute interval. After raising the reactor temperature to 220° F. over a ten minute interval, an additional 253 lbs. of toluene were added over a 3–5 minute interval to form Blend Component I.

Hexanediol adipate (240.2 lbs. of Fomrez 66-112 from Witco Chemical) was added to a second reactor, nitrogen blanketed and heated to 150° F. under agitation, the nitrogen blanket was then secured and the hexanediol adipate was dried under vacuum. After drying for an hour, the nitrogen purge was restarted. Over a 3–5 minute interval, 240.2 lbs. of toluene were added to the reactor, while maintaining the temperature at 150° F., to form Blend Component II.

The urethane blend was then formed from Blend Component I and Blend Component II. Initially, 753.36 lbs. of hydrogenated methylene diisocyanate (Desmodur W from Bayer) were added to a reactor. While stirring, and with nitrogen blanketing, 0.14 lbs. of dibutyl-10-dilaurate (Dabco 12 from Air Products) were added to the reactor. The nitrogen blanketing was then secured. After the reaction temperature reached 100° F., the reactor was cooled by injecting cold air into the reactor. Then, over a forty minute interval, 1012 lbs. of Blend Component I were added to the reactor. During a subsequent forty minute interval, 600 lbs. of toluene were added to the reactor.

Reactor cooling was secured and then the reactor was maintained at 100° F., with stirring, over a subsequent hour long interval.

Blend Component II (480.4 lbs.) was added to the reactor over a 5–10 minute interval while maintaining reactor temperature at about 150° F. Then 153.4 lbs. of toluene were added to the reactor over a 3–5 minute interval after which the reactor was maintained at 150±20° F. for an hour.

Additional toluene (750 lbs.) was then added to the reactor over a 5 minute interval, to form a urethane blend containing isocyanate terminated oligomer (about 40 wt. %) in toluene with a free NCO content typically between about 3.3–3.6%. The urethane blend was further mixed for 15–20 minutes and then the reactor was blanketed with nitrogen.

EXAMPLE 2

Synthesis of a Basecoat Composition

The basecoat resin to be applied to the substrate was formed by mixing 39.9 grams of a urethane blend with 1.6 grams of the tin catalyst (5% UL-28, Witco Chemicals, containing 5% solids), 23.4 grams of a polyester resin containing carbon-black (3090 Tint paste, purchased from PPG, containing 40% solids) and 35.1 grams of a solvent blend.

The urethane blend was similar to that in Example 1 with the exception that the resin is in xylene instead of toluene and contains 40% solid instead of 50% solids.

The solvent blend used contains 60 wt. % propylene glycol methyl ether acetate (PMA), 25 wt. % dispropylene glycol methyl ether acetate (DPMA), and 15 wt. % of a blend of dibasic esters (purchased from Dupont) containing 55–65% dimethyl glutarate, 10–25% dimethyl adipate and 15–25% dimethyl succinate (hereinafter "DBE").

EXAMPLE 3

Synthesis of a Top Coat Composition

The metal-bonding top coat of the present invention was synthesized by mixing the urethane blend of Example 1 with the silane additive gamma-glycidoxypropyltrimethoxy silane (A187 purchased from OSi Specialties, Danbury, Conn.).

A solvent blend (5345 grams) was added to a reactor using an automated delivery system. The solvent blend contains 62.5 wt. % propylene glycol methyl ether acetate (PMA), 22.5 wt. % xylene, 10 wt. % a dipropylene glycol methyl ether acetate (DPMA) and 5 wt. % DBE.

During solvent addition, 287 grams of ultraviolet absorber (TINUVIN 328, Ceiba-Geigy), 190 grams of silane additive and then 212 grams of 2% dibutyl-10-dilaurate (Dabco 12) were sequentially added to the reactor, with agitation throughout the addition.

Once the above-identified components were completely in solution, 12470 grams of the urethane blend of Example 1 was slowly added with continued agitation of the contents of the reactor to form the metal-bonding top coat resin of the present invention.

To preclude physical separation of the urethane and the silane in the top coat resin, the top coat resin was maintained under agitation until application.

EXAMPLE 4

Comparison of Top Coat Performance With and Without NaOH Etch

Ten aluminum wheels were vacuum metallized according to the method of this invention. Five of the wheels were then etched with NaOH according to the method of U.S. Pat. No. 4,713,143. All ten wheels were then top coated with a standard thickness of the top coat composition of Example 3.

The etched and non-etched wheels were then heat stability tested with one sample of each exposed to 1, 5, 10, 15 and 20 heating cycles. The samples were then tested for discoloration of the top coat using an X-Rite Spectrophotometer (Model No. SP78).

The results of the test showed that the top coat on the etched wheels underwent significant, yet unexpected, changes in color, darkness and dullness as compared to the top coat of the non-etched wheels.

For yellow to blue, the delta color reading "b*" for the non-etch top coat was about 7.5, 27 and 29 at 10, 15 and 20 cycles, respectively. The delta color reading "b*" for the non-etch top coat was about 6.5, 18.5 and 31 at 10, 15 and 20 cycles, respectively.

For red to green, the delta color reading "a*" for the etch top coat was about 1, 2 and 15.5 at 10, 15 and 20 cycles, respectively. The delta color reading "a*" for the non-etch top coat was about 1, 1 and 6 at 10, 15 and 20 cycles, respectively.

For dulling, the delta color reading "Y" for the etch top coat was about 14, 19 and 23 at 10, 15 and 20 cycles, respectively. The delta color reading "Y" for the non-etch top coat was about 4, 16 and 18 at 10, 15 and 20 cycles, respectively.

For darkening (white to black), the delta color reading "X" for the etch top coat was about 8, 11.5 and 14 at 10, 15 and 20 cycles, respectively. The delta color reading "X" for the non-etch top coat was about 2, 8 and 10 at 10, 15 and 20 cycles, respectively.

Equivalents

Those skilled in the art will recognize, or be able to ascertain using no more than routine experimentation, many equivalents to specific embodiments of the invention described specifically herein. Such equivalents are intended to be encompassed in the scope of the following claims.

The invention claimed is:

1. A metallized article comprising:
   a substrate;
   a polyurethane basecoat disposed upon said substrate;
   a layer of electrically discrete metallic islands of a corrosion prone metal disposed upon the basecoat;
   a polyurethane topcoat disposed on and encapsulating the discrete metallic islands, the topcoat comprising an epoxy silane.

2. The metallized article according to claim 1 wherein said epoxy silane is present at about 0.25–8.0 wt. % of said polyurethane topcoat.

3. The metallized article according to claim 1 further comprising an aminosilane.

4. The metallized article according to claim 3 having an epoxy silane to aminosilane ratio of about 1:20 to 1:5.

5. The metallized article according to claim 4 having an epoxy silane to aminosilane ratio of about 1:10.

6. The metallized article according to claim 3 having an epoxy silane to aminosilane ratio of about 20:1 to 5:1.

7. The metallized article according to claim 6 having an epoxy silane to aminosilane ratio of about 10:1.

8. The metallized article according to claim 1 wherein said substrate comprises a dielectric substrate comprising thermoplastic materials or thermoset materials.

9. The metallized article according to claim 8 wherein said thermoplastic material is selected from the group consisting of polyolefins, polyacrylonitrile-butadiene-styrene, poly(vinyl chloride), ionomer resins, polyester, and polyester elastomers.

10. The metallized article according to claim 8 wherein said substrate comprises plastic sheet stock.

11. The metallized article according to claim 8 wherein said substrate includes an adhesion promoter.

12. The metallized article according to claim 1 wherein said substrate comprises a conductive substrate.

13. The metallized article according to claim 12 wherein said conductive substrate is selected from the group consisting of aluminum, aluminum alloy, carbon steel, iron, brass, copper, nickel, nickel alloy, stainless steel, magnesium alloy and zinc based materials.

14. The metallized article according to claim 12 wherein said conductive substrate includes a corrosion resistant coating.

15. The metallized article according to claim 1 wherein said corrosion prone metal disposed on the surface of the base coat are selected from the group consisting of tantalum, copper, silver, nickel, chromium, tin, aluminum and alloys thereof.

16. A method for preparing a metallized article comprising the steps of:
   vacuum metallizing a substrate with a corrosion prone metal to produce a layer of discrete metallic islands on the substrate;
   forming an epoxy silane modified polyurethane top coat composition;
   applying the top coat composition to the vacuum metallized substrate to form a top coat layer; and
   curing the top coat layer, whereupon a urethane polymer is formed and the epoxy silane bonds to the urethane polymer and to the metallic islands.

17. The method according to claim 16 further comprising the steps of applying a urethane basecoat composition to the substrate prior to vacuum metallizing the substrate, and curing the base coat.

18. The method according to claim 16 wherein the epoxy silane is present to about 0.25–8.0 wt. % of the polyurethane topcoat.

19. The method according to claim 16 wherein the top coat is formed further comprising an aminosilane.

20. The method according to claim 19 wherein the epoxy silane and the amino silane are present in a ratio of about 20:1 to 5:1.

21. The method according to claim 19 wherein the epoxy silane and the aminosilane are present in a ratio of about 1:20 to 1:5.

* * * * *